(12) United States Patent
Nandyalam et al.

(10) Patent No.: US 9,280,646 B1
(45) Date of Patent: Mar. 8, 2016

(54) METHODS, SYSTEMS, AND COMPUTER READABLE MEDIUMS FOR ROLE-BASED ACCESS CONTROL INVOLVING ONE OR MORE CONVERGED INFRASTRUCTURE SYSTEMS

(71) Applicant: VCE Company, LLC, Richardson, TX (US)

(72) Inventors: Rajesh Nandyalam, Whitinsville, MA (US); Venkatesh Madhipatla, Westford, MA (US); Joshua P Onffroy, Upton, MA (US); Xiaohong Fu, Plano, TX (US)

(73) Assignee: VCE Company, LLC, Richardson, TX (US)

( * ) Notice: Subject to any disclaimer, the term of this patent is extended or adjusted under 35 U.S.C. 154(b) by 1 day.

(21) Appl. No.: 14/109,594

(22) Filed: Dec. 17, 2013

(51) Int. Cl.
  *G06F 7/04* (2006.01)
  *G06F 17/30* (2006.01)
  *H04N 7/16* (2011.01)
  *G06F 21/31* (2013.01)

(52) U.S. Cl.
  CPC ..................................... *G06F 21/31* (2013.01)

(58) Field of Classification Search
  CPC ....................................................... G06F 21/31
  USPC .......................................................... 726/28
  See application file for complete search history.

(56) References Cited

U.S. PATENT DOCUMENTS

| | | | |
|---|---|---|---|
| 7,546,640 B2* | 6/2009 | Chang et al. | 726/28 |
| 7,669,244 B2* | 2/2010 | Smith | 726/26 |
| 8,365,304 B2* | 1/2013 | Sebesta et al. | 726/28 |
| 8,813,250 B2* | 8/2014 | Morita | 726/28 |
| 8,959,115 B2* | 2/2015 | Marathe | 707/785 |
| 9,003,295 B2* | 4/2015 | Baschy | G06F 9/4443 715/741 |
| 2010/0214949 A1* | 8/2010 | Smith et al. | 370/254 |
| 2011/0265188 A1* | 10/2011 | Ramaswamy et al. | 726/28 |
| 2012/0060207 A1* | 3/2012 | Mardikar et al. | 726/4 |
| 2012/0102080 A1* | 4/2012 | Kirihata et al. | 707/831 |
| 2014/0075518 A1* | 3/2014 | D'Souza et al. | 726/4 |
| 2014/0282889 A1* | 9/2014 | Ishaya et al. | 726/4 |

* cited by examiner

*Primary Examiner* — Jason Lee
*Assistant Examiner* — Khalil Naghdali
(74) *Attorney, Agent, or Firm* — Jenkins, Wilson, Taylor & Hunt, P.A.

(57) ABSTRACT

Methods, systems, and computer readable mediums for implementing role-based access control (RBAC) are disclosed. According to one method, the method includes authenticating a user for implementing RBAC across multiple components associated with one or more converged infrastructure systems, receiving, from the user, RBAC related information for implementing RBAC across the multiple components associated with the one or more converged infrastructure systems, and implementing, using the RBAC related information, RBAC across the multiple components associated with the one or more converged infrastructure systems.

11 Claims, 7 Drawing Sheets

| USERNAME | ROLE(S) | PERMISSION(S) | LOCATION(S) |
|---|---|---|---|
| ASMITH23 | SITE MANAGER | SET A, SET B, SET C, SET D, SET E | VBLOCK-1 (US) VBLOCK-2 (US) |
| GWU73 | ADMINISTRATOR | SET A, SET B, SET C, SET D, SET E, SET F (ALL) | VBLOCK-1 (US) VBLOCK-2 (US) VBLOCK-3 (UK) VBLOCK-4 (JP) |
| KNGUYEN34 | SITE TECHNICIAN | SET A, SET B, SET C | VBLOCK-1 (US) VBLOCK-2 (US) |
| RKING86 | TESTER | SET A, SET D | VM-1.VBLOCK-2 (US) |
| LQO180 | SITE TECHNICIAN, TESTER | SET A, SET B, SET C, SET D | VBLOCK-1 (US) VBLOCK-2 (US) |
| TMARQUEZ12 | DATA CENTER MANAGER | SET A, SET B, SET C, SET D, SET E | VBLOCK-1 (US) VBLOCK-2 (US) VBLOCK-3 (UK) VBLOCK-4 (JP) |
| ASMITH23 | AUDITOR | SET A | VBLOCK-3 (UK) VBLOCK-4 (JP) |

METHODS, SYSTEMS, AND COMPUTER READABLE MEDIUMS FOR ROLE-BASED ACCESS CONTROL INVOLVING ONE OR MORE CONVERGED INFRASTRUCTURE SYSTEMS

TECHNICAL FIELD

The subject matter described herein relates to access control. More specifically, the subject matter relates to methods, systems, and computer readable mediums for role-based access control (RBAC) involving one or more converged infrastructure systems.

BACKGROUND

Role-based access control (RBAC) is a security technique for controlling access to systems by granting a user access to certain resources or functions based on one or more roles performed by the user. That is, a user can be assigned to one or more roles, where each role can be associated with one or more system permissions. For example, a software tester can be assigned a tester role associated with a set of permissions that allows the software tester to install or modify software on a workstation, but cannot include permissions to access a human resources (HR) database containing confidential data about other employees. In another example, an HR representative can be assigned an HR role associated with a set of permissions that allows the HR representative to access an HR database, but cannot include permissions to install or modify software on a workstation. By using roles to perform access control, access control management can be simplified and more efficiently implemented. For example, when granting permissions to a new user, an RBAC administrator can assign the new user to one or more roles that the user is expected to perform without requiring the RBAC administrator to select or even know all relevant permissions required to perform each assigned role. Moreover, if the user changes roles, the RBAC administrator can reassign the user to new roles and can remove or unassign the user from unnecessary roles.

Data centers typically involve numerous elements, e.g., servers, switches, storage devices, network management systems, and other equipment. Traditionally, each data center element is configured with an element manager. For example, each element manager can provide or enforce access control capabilities for a particular element, thereby requiring each element to be managed and configured independently with regard to RBAC. However, using numerous element managers to implement RBAC is tedious, inefficient, and can increase implementation errors.

SUMMARY

Methods, systems, and computer readable mediums for implementing role-based access control (RBAC) are disclosed. According to one method, the method includes authenticating a user for implementing RBAC across multiple components associated with one or more converged infrastructure systems, receiving, from the user, RBAC related information for implementing RBAC across the multiple components associated with the one or more converged infrastructure systems, and implementing, using the RBAC related information, RBAC across the multiple components associated with the one or more converged infrastructure systems.

BRIEF DESCRIPTION OF THE DRAWINGS

The subject matter described herein will now be explained with reference to the accompanying drawings of which:

FIG. 4 is a diagram illustrating exemplary RBAC data according to an embodiment of the subject matter described herein;

DETAILED DESCRIPTION

Figure 1:
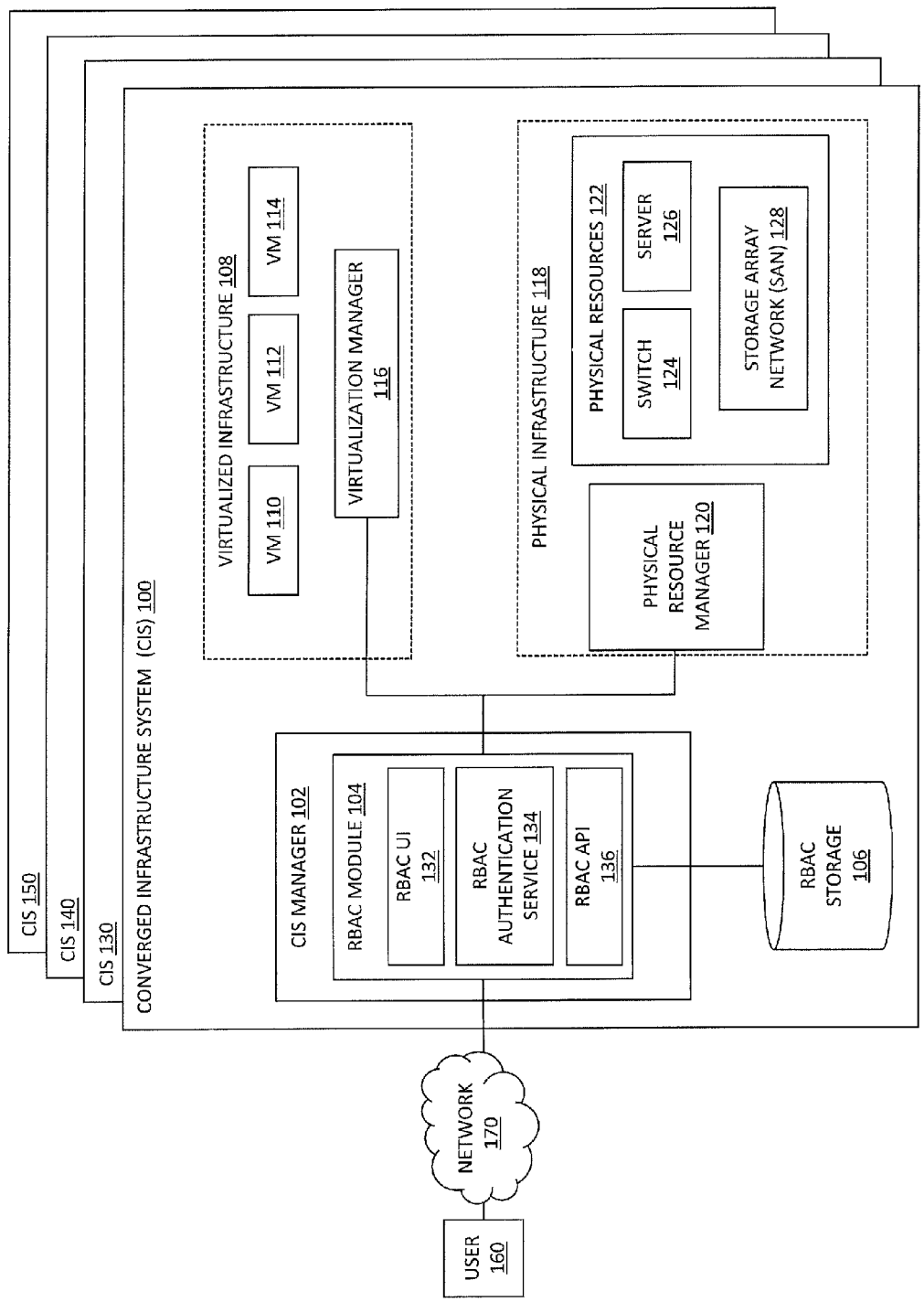
FIG. 1 is a diagram illustrating exemplary converged infrastructure systems according to an embodiment of the subject matter described herein.

The present disclosure discloses methods, systems, and computer readable mediums for role-based access control (RBAC) involving one or more converged infrastructure systems (CISs). CISs, such as Vblock™ Systems from VCE Company LLC, can comprise multiple components or elements in a preconfigured or prepackaged computing platform. For example, a CIS can be a computing platform containing racks of components (e.g., hardware or firmware) and related software for performing virtualization and/or other functions. In this example, a CIS can comprise data storage devices, servers, networking equipment, and software for managing physical resources and/or virtual resources. While a CIS can centralize and consolidate computing resources, implementing RBAC at a CIS has traditionally required using multiple element managers to configure RBAC associated with the individual components of the CIS. For example, an RBAC administrator can be required to log in to each component of a CIS to add, delete, or modify RBAC settings associated with that component. This problem can be further compounded if a deployment environment includes multiple CISs since the RBAC administrator has to log in and configure each component of each CIS in the deployment environment. Hence, using multiple element managers for implementing RBAC is tedious, inefficient, and can increase implementation errors.

In accordance with some aspects of the present disclosure, RBAC can be configured and/or implemented across one or more CISs and/or related components or resources therein. For example, an RBAC module (e.g., software executing on a processor) in accordance with some aspects of the present disclosure can provide centralized configuration and/or viewing of role-based, security access settings for disparate and/or heterogeneous components (e.g., hardware, firmware, and/or software) associated with one or more CISs. In this example, the RBAC module can be usable to implement RBAC for a Vblock™ System, a set of Vblock™ Systems, or components (e.g., physical and virtual resources) within a Vblock™ System.

Moreover, in accordance with some aspects of the present disclosure, RBAC configuration and/or implementation of one or more CISs can be implemented from various CISs. For example, in a deployment environment involving multiple Vblock™ Systems located in various countries, an RBAC administrator can utilize an RBAC module in accordance with some aspects of the present disclosure to log into a first Vblock™ System and configure an RBAC policy to be implemented at a second Vblock™ System (e.g., located in the United Kingdom) and at a third Vblock™ System (e.g., located in Japan).

Further, in accordance with some aspects of the present disclosure, RBAC policies or templates can be stored for future implementation. For example, an RBAC policy can be generated at a first Vblock™ System and stored in memory (e.g., a database). By storing an RBAC policy in memory, the RBAC policy can be utilized numerous times without requiring an RBAC administrator to regenerate the RBAC policy, e.g., a stored RBAC policy can be implemented at a new CIS such that the new CIS inherits the same RBAC settings and configurations as an existing CIS. Moreover, the RBAC policy can be stored in a clustered database system such that all CISs in a given deployment have functionality (e.g., a clustered database interface or module) for accessing and/or using the RBAC policy.

Advantageously, by unifying RBAC configuration and/or implementation across components associated with one or more CISs, RBAC configuration efficiency can be improved, auditable policy consistency can be achieved, and RBAC related configuration and/or implementations errors (e.g., human user errors) can be significantly reduced. Moreover, by storing RBAC policies for future use, RBAC configuration efficiency can be further improved since an RBAC administrator can reuse existing RBAC policies.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating exemplary CIS 100, CIS 130, CIS 140, and CIS 150 according to an embodiment of the subject matter described herein. Each of CIS 100, CIS 130, CIS 140, and CIS 150 can comprise one or more components, such as physical resources and virtual resources. Exemplary physical resources can comprise a processor, a server, network equipment, a router, a switch, wiring or cabling, a memory, a storage device, a physical port, and/or a communications interface. Exemplary virtual resources can comprise a virtual entity (e.g., an entity that appears as a physical entity but consists of one or more components associated with one or more CISs), a virtual machine, a virtual server, a virtual storage device, a virtual processor, a virtual memory, virtual network equipment, a virtual switch, a virtual router, a virtual port, and/or a virtual communications interface. Each of CIS 100, CIS 130, CIS 140, and CIS 150 can comprise software and related components for managing CIS and/or portions therein.

In some embodiments, each of CIS 100, CIS 130, CIS 140, and CIS 150 can be a Vblock™ System from VCE and can be configured to provide data center functionality, cloud service functionality, and/or other functionality. In some embodiments, each of CIS 100, CIS 130, CIS 140, and CIS 150 can comprise similar components (e.g., servers, storage devices, network equipment, and software) and can be located at one or more physical locations or sites. Each of CIS 100, CIS 130, CIS 140, and CIS 150 can be capable of communicating with each other and can communicate with various other entities, such as network nodes (e.g., computing platforms including one or more processors and memory) and user devices. For example, user 160 (e.g., a human operator or an automated system) can use an application programming interface (API) or web-based graphical user interface (GUI) to log in to CIS 100 and/or a related component for configuring or implementing RBAC.

CIS 100 can comprise a CIS manager 102, RBAC storage 106, a virtualized infrastructure 108, and/or a physical infrastructure 118. CIS manager 102 can be any suitable entity for managing aspects of CIS 100. CIS manager 102 can be configured to communicate with various CIS components, such as virtual resources, physical resources, and/or software for managing various components. For example, CIS manager 102 can be configured to manage performance, resource utilization levels, and other aspects associated with virtualized infrastructure 108 and/or physical infrastructure 118.

In some embodiments, CIS manager 102 can include user management software (e.g., VCE Vision™ Intelligent Operations software) which can enable and simplify converged operations associated with CIS 100. For example, CIS manager 102 and related software can act as a mediation layer between CIS 100 and data center management tools and can dynamically inform those tools about CIS 100 and vice versa. CIS manager 102 and related software can deliver intelligent discovery to provide a single-objective perspective on CIS 100 and promotes infrastructure standardization through automated validation, system assurance, and integration capabilities, such as integrated RBAC functionality.

In some embodiments, CIS manager 102 can comprise or interact with an RBAC module 104. RBAC module 104 can be any suitable entity (e.g., hardware, firmware, or software in combination with hardware and/or firmware) for configuring and/or implementing RBAC. RBAC module 104 can comprise or provide an RBAC user interface (UI) 132, an RBAC authentication service (RAS) 134, and an RBAC API 136.

RBAC UI 132 can be any suitable entity (e.g., a GUI, an API, a command line interface (CLI), or a communications interface) for interacting with user 160 and/or other entities, such as virtualized infrastructure 108, physical infrastructure 118, CIS 130, CIS 140, CIS 150 or nodes in network 170. For example, RBAC UI 132 can be a GUI provided via user management software executing on CIS 100. RBAC UI 132 can include various graphical elements (e.g., buttons, lists, icons, etc.) for facilitating communications between user 160 and CIS 100.

In some embodiments, RBAC UI 132 can receive user credentials from user 160 and can facilitate user authentication by communicating with RAS 134 via an authentication protocol. RAS 134 can be any suitable entity for performing authentication. For example, RAS 134 can use a central authentication service (CAS) or another authentication mechanism for authenticating user 160. In this example, RAS 134 can consult a user database containing user credentials. After authenticating user 160, RAS 134 can inform RBAC UI 132 and RBAC UI 132 can allow the authorized user to view and/or modify RBAC related settings, e.g., via a GUI.

In some embodiments, RAS 134 can access a user database that is distributed across numerous nodes to increase redundancy and/or reliability. For example, RAS 134 can be associated with a clustered database system that includes storage devices at CIS 130, CIS 140, and/or CIS 150.

In some embodiments, RBAC UI 132 can be configured to perform or facilitate RBAC related user management. For example, RBAC UI 132 can be configured to allow (e.g., via a GUI) an authorized user to add a user, drop a user, or modify RBAC related user information. In some embodiments, RBAC module 104 can be configured such that one or more roles can be assigned to a user, where each role is associated with one or more permissions for accessing or utilizing a physical resource or a logical resource associated with CIS 100, CIS 130, CIS 140, and/or CIS 150.

In some embodiments, RBAC UI 132 can be configured to facilitate and/or allow certain resources (e.g., physical resources and/or virtual resources) to be logically grouped for RBAC purposes. For example, a group of VMs executing on a server that use a set of switches and certain storage devices can be group as an "Executive Data Center" logical entity. In this example, user 160 can generate and apply access controls that are relevant to only resources in the "Executive Data Center" logical entity.

In some embodiments, RBAC UI 132 can dynamically determine which permissions and/or roles are allowed depending on a logical entity. For example, if a logical entity includes only switches, RBAC UI 132 can prevent permissions for creating storage partitions. However, in this example, if a storage device is added to the logical entity, RBAC UI 132 can allow permissions for creating storage partitions.

In some embodiments, user 160 (e.g., a system administrator) can use grouping criteria to select resources for a logical entity. Exemplary grouping criteria can comprise physical or virtual geography, storage device tiers, port protocols, redundancy concerns, power consumption, or estimated requirements for a logical entity.

In some embodiments, RBAC UI 132 can be configured to facilitate and/or allow (e.g., via a GUI) an authorized user to add a role, drop a role, or modify a role. For example, using RBAC UI 132, a new role can be created and one or more permissions can be associated with the new role. In another example, a role can be modified to be associated with additional permissions or a role can be deleted.

In some embodiments, RBAC UI 132 can be configured to facilitate and/or allow (e.g., via a GUI) an authorized user to add a permission, drop a permission, or modify a permission. For example, using RBAC UI 132, a new permission can be created so as to utilize a new software feature, a server, a new VM, or other resource. In another example, a permission can be modified or can be deleted.

In some embodiments, RBAC UI 132 can be configured to facilitate and/or allow (e.g., via a communications interface) an authorized user to add a location (e.g., CIS 100 or a component or resource therein where RBAC can be implemented), drop a location, or modify a location. For example, using RBAC module 104, a new location can be created so as to utilize a newly instantiated VM or a recently deployed CIS. In another example, a location can be modified or can be deleted.

In some embodiments, RBAC UI 132 can be configured to facilitate and/or allow (e.g., via a communications interface) an authorized user to generate RBAC related information usable to implement RBAC associated with components of one or more CISs. For example, RBAC configuration information can comprise RBAC configuration information, such as an RBAC policy. In this example, an RBAC policy can indicate one or more roles and corresponding permissions assigned to a user along with locations that the RBAC policy should be implemented. For example, some users can be assigned roles that are site or component specific, whereas other users can be assigned roles that are universal (e.g., applicable at all CISs in a deployment environment), In some embodiments, RBAC UI 132 can implement or trigger implementing RBAC by communicating with RBAC API 136. RBAC API 136 can be any suitable entity (e.g., software executing on a processor) for implementing RBAC, e.g., using received or stored RBAC related information. In some embodiments, RBAC API 136 can communicate with a virtualization manager 116, physical resource manager 120, and/or other entities to implement or apply RBAC at one or more CISs, or portion therein.

In some embodiments, RBAC module 104 and/or related functionality can generate control path information for directing or instructing one or more CISs or components therein. Exemplary control path information can include RBAC related information (e.g., RBAC configuration information and/or an RBAC policy). For example, control path information, such as an RBAC policy, can be sent to one or more RBAC modules located at CIS 130, CIS 140, and/or CIS 160. The control path information can be received and processed at each RBAC module such that the RBAC policy is applied or implemented at CIS 130, CIS 140, and/or CIS 160. By applying an RBAC policy at multiple locations from a single location (e.g., via RBAC UI 132 or RBAC API 136), efficiency and consistency associated with RBAC management can be significantly improved.

In some embodiments, RBAC API 136 can include a representation state transfer (REST) API or a REST web service that communicates control path information and/or other information with various entities (e.g., RBAC UI 132) using REST API related messages. For example, REST API related messages can be used for triggering commands or instructions at entities having unknown protocols or different protocols than the sender. Exemplary REST API related messages can include uniform resource identifiers (URIs) that indicate resources and various actions to perform.

In some embodiments, RBAC API 136 can provide an API layer or other functionality that performs RBAC related validation prior to implementing an CIS related management API call. For example, before allowing control path information that affects a CIS or CIS component to be applied, RBAC API 136 may validate whether the control path information is associated with a user having sufficient permissions.

In some embodiments, RBAC API 136 can be configured to receive and process a REST API related message. For example, in response to receiving a REST API related message, RBAC API 136 can be configured to identify an appropriate communications protocol for communicating with a resource identified in the REST API related message. Using the identified protocol, RBAC API 136 can generate one or more component specific messages that can be understood by the resource identified in the REST API related message. Exemplary component specific messages can include a simple network management (SNMP) related message, a telnet related message, a secure shell (SSH) related message, a command line related message, an extensible markup language (XML) API related message, an XML related message, and/or a storage management interface (SMI) related message.

For example, RBAC API 136 can receive a REST API related message (e.g., http://host:8443/fm/server/126/kill/VM/112) for instructing server 126 to kill or quit VM 112. RBAC API 136 may know or determine that server 126 communicates using an XML API related protocol. In response to knowing or determining that server 126 communicates using an XML API related protocol, RBAC API 136 can generate one or more XML API related messages for killing or quitting VM 112.

In another example, RBAC API 136 can receive a REST API related message (e.g., http://host:8443/fm/san/128/reserve/4gb/VM/110) for instructing SAN 128 to reserve storage for VM 110. RBAC API 136 may know or determine that SAN 128 communicates using an SMI protocol. In response to knowing or determining that SAN 128 communicates using an SMI protocol, RBAC API 136 can generate one or more SMI related messages for reserving 4 gigabytes of storage for VM 110.

In yet another example, RBAC API 136 can receive a REST API related message (e.g., http://host:8443/fm/switch/124/reset/routingtable) for instructing switch 124 to reset its routing table. RBAC API 136 may know or determine that switch 124 communicates using a CLI protocol. In response to knowing or determining that switch 124 communicates using a CLI protocol, RBAC API 136 can generate one or more CLI related messages for resetting the routing table of switch 124.

In some embodiments, RBAC module 104 and/or related functionality can access and/or store RBAC related information, such as RBAC configuration information or an RBAC policy, in RBAC storage 106. For example, RBAC module 104 can be configured to store an RBAC policy for future use. In this example, storing an RBAC policy can be performed automatically by RBAC module 104 or can be triggered by user 160, e.g., by a GUI interaction or an API interaction.

RBAC storage 106 can be any suitable entity (e.g., a storage device or a database system) for storing RBAC related information, including permissions and roles associated with one or more users. In some embodiments, RBAC storage 106 can include a clustered database system. In such embodiments, RBAC related information can be accessible within the cluster by any authorized user or entity. For example, a clustered database system can maintain RBAC configuration information and/or RBAC policies for 100 users, where the RBAC related information can be distributed among multiple storage devices such that any CIS associated with the cluster can access or utilize the RBAC related information. In this example, using the clustered database system and a related interface, user 160 can access RBAC related information to implement RBAC at any CIS associated with the cluster from any CIS associated with the cluster.

Virtualized infrastructure 108 can comprise a virtualization environment configured to simulate components of a computing device, e.g., a processor, system memory, and a storage device, for executing one or more virtual machines (VMs) (e.g., VM 110, VM 112, and VM 114). Each of VM 110, VM 112, and VM 114 can be configured to perform various functions and/or services, such as web server functions or cloud application services, and can interact with various nodes, components, and/or users.

In some embodiments, virtualized infrastructure 108 can be associated with one or more virtual entities. Each virtual entity can comprise one or more CIS or portions therein, e.g., resources from one or more Vblock™ Systems. In some embodiments, virtualization manager 116 can allow logical entities to be created, deleted, or modified using an API and/or GUI.

Virtualization manager 116 can be any suitable entity (e.g., software executing in a virtual machine) for managing aspects associated with virtualized infrastructure 108. In some embodiments, virtualization manager 116 can be configured to provide data center management through one or more communications interfaces. For example, virtualization manager 116 can communicate with one or more third-party management tools using APIs. Virtualization manager 116 can be configured to implement RBAC policies provided by RBAC module 104. For example, after receiving an RBAC policy from RBAC module 104, virtualization manager 116 can set permissions to various virtual resources and/or related virtual entities in accordance with the RBAC policy. In some embodiments, virtualization manager 116 can also set permissions for underlying physical resources or can communicate with physical resource manager 120 to apply such permissions.

Physical infrastructure 118 can comprise physical resources 122, such as switch 124, server 126, and SAN 128. Physical resources 122 can be communicatively connected to various other components in CIS 100 and other entities. Switch 124 can represent any suitable entity for routing, forwarding, or otherwise sending packets to various destinations. For example, switch 124 can be a Cisco Nexus 9000 data center switch and can be connected to one or more other switches or components via a network fabric. Server 126 can represent any suitable entity for providing computing resources. For example, server 126 can be one of multiple B-series blade server modules in a Cisco UCS 5108 chassis of CIS 130. SAN 128 can represent any suitable entity for providing storage. For example, SAN 128 can include an EMC VNX storage system.

Physical resource manager 120 can be any suitable entity (e.g., software executing in a virtual machine) for managing aspects associated with physical infrastructure 118. In some embodiments, physical resource manager 120 can be configured to provision hardware resources 122 via one or more communications interfaces. For example, physical resource manager 120 can provision hardware resources 122 for implementing one or more virtual entities in virtualized infrastructure 108. Physical resource manager 120 can be configured to implement RBAC policies provided by RBAC module 104. For example, after receiving an RBAC policy from RBAC module 104, physical resource manager 120 can set permissions to various physical resources in accordance with the RBAC policy.

In some embodiments, each of physical resources 122 can communicate using diverse protocols, commands, and/or syntaxes. As such, physical resource manager 120 or other CIS entitles (e.g., RBAC API 136) can be configured to communicate with physical resources 122 via a variety of communications interfaces and protocols. Exemplary communications between CIS entities and physical resources 122 can utilize component specific proprietary protocols and standardized protocols, such as XML related protocol, an XML API (e.g., for Cisco products) related protocol, an SNMP related protocol, a REST related protocol, and/or an SMI related protocol.

It will be appreciated that FIG. 1 is for illustrative purposes and that various nodes, their locations, and/or their functions described above in relation to FIG. 1 can be changed, altered, added, or removed. For example, RBAC module 104 or functionality therein (e.g., RBAC UI 132) can be integrated with various other modules or components or can be a distinct entity (e.g., a central RBAC management node) separate from CIS manager 102.

Figure 2:
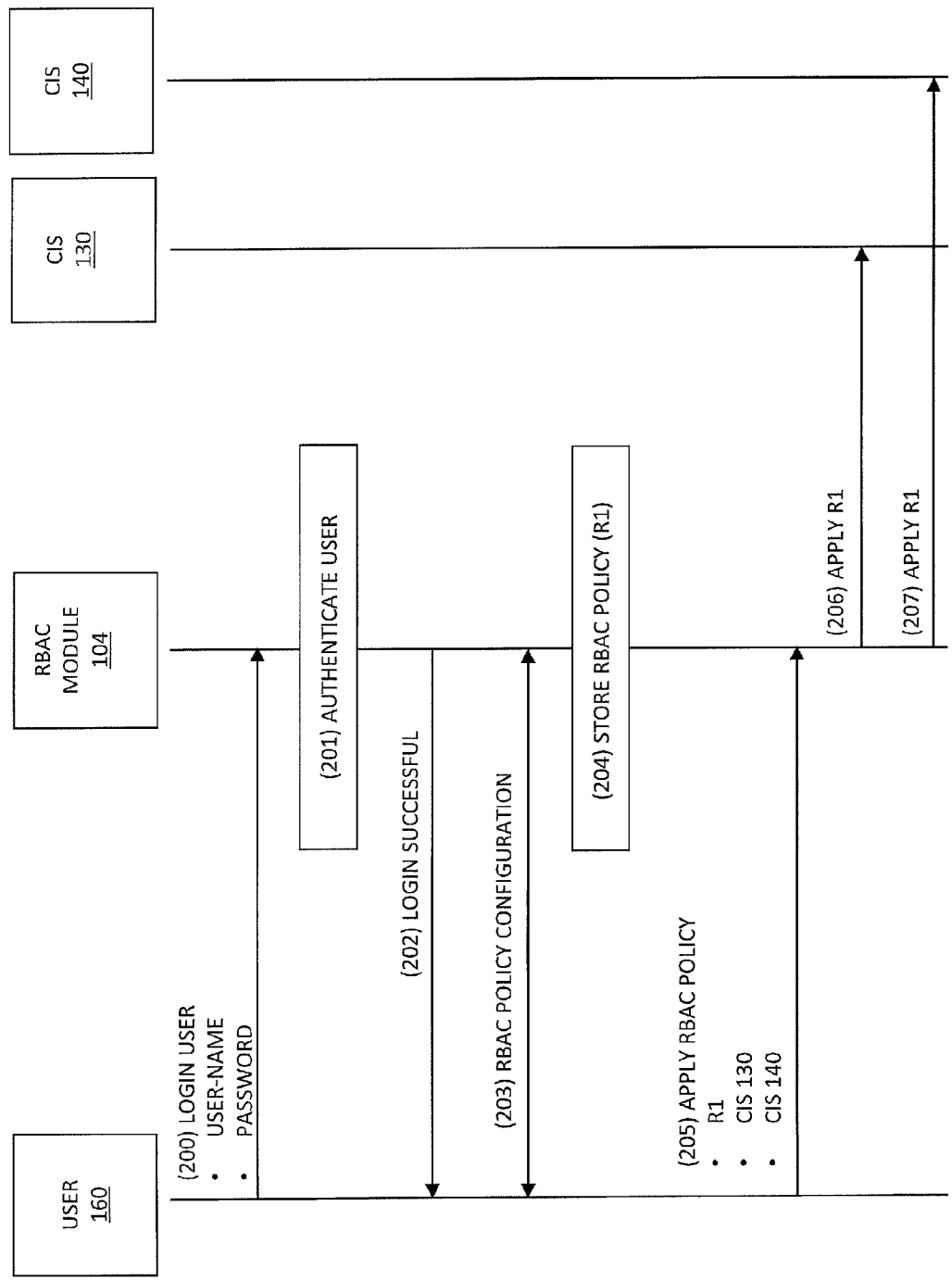
FIG. 2 is a diagram illustrating exemplary messages associated with implementing RBAC at multiple CISs according to an embodiment of the subject matter described herein.

FIG. 2 is a diagram illustrating exemplary messages associated with implementing RBAC at CIS 130 and CIS 140 according to an embodiment of the subject matter described herein. In some embodiments, user 160 can communicate with RBAC module 104 to configure and/or implement RBAC policies. In some embodiments, an RBAC policy can be stored (e.g., in RBAC storage 106) for future use and/or can be implemented or applied concurrently with RBAC policy generation.

Referring to FIG. 2, at step 200, a login request message can be sent from user 160 to RBAC module 104. The login request message can be for user authentication and can comprise user credentials, such as a username and password. In some embodiments, the login request message can represent a GUI interaction, an API interaction, or CLI interaction.

At step 201, RBAC module 104 can authenticate user 160. For example, RBAC module 104 can receive the login message and use the contained user credentials to authenticate user 160 via CAS or another authentication mechanism.

At step 202, a login response message can be sent from RBAC module 104 to user 160. The login response message can be for indicating that user authentication was completed successfully. In some embodiments, the login response message can represent a GUI interaction, an API interaction, or CLI interaction.

At step 203, RBAC policy configuration can be performed. For example, user 160 can provide RBAC configuration information via a GUI, a CLI, and/or an API (e.g., via an enterprise JavaBeans (EJB) service or a REST web service). The RBAC configuration information can indicate an association between user 160 or another user and one or more roles and can comprise various locations for the user-associated RBAC to be implemented.

At step 204, RBAC module 104 can store received RBAC configuration information, e.g., an RBAC policy. For example, an RBAC policy can be stored in RBAC storage 106 and can be accessible for future use. In some embodiments, storing RBAC configuration information can be performed automatically by RBAC module 104 or can be triggered by user 160, e.g., by a GUI interaction or an API interaction.

In some embodiments, an RBAC policy can be implemented concurrently with RBAC policy generation. For example, after receiving RBAC configuration information from user 160, an RBAC policy based on the RBAC configuration information can be implemented at CIS 100 or components therein, such as a physical resource or a logical entity (e.g., VM 110).

At step 205, an RBAC application request message can be sent from user 160 to RBAC module 104. The RBAC application request message can be for implementing or applying an RBAC policy at one or more locations. For example, the RBAC application request message can identify one or more RBAC policies (e.g., RBAC policy R1) and one or more locations for the one or more RBAC policies (e.g., CIS 130 and CIS 140) to be applied. In some embodiments, the RBAC application request message can represent a GUI interaction, an API interaction, or CLI interaction.

At step 206, an RBAC command message can be sent from RBAC module 104 to CIS 130. The RBAC command message can include control path information for applying or implementing one or more RBAC policies, such as RBAC policy R1 indicated in the RBAC application request message of step 205. In some embodiments, the RBAC command message can represent a GUI interaction, an API interaction, or CLI interaction.

At step 207, an RBAC command message can be sent from RBAC module 104 to CIS 140. The RBAC command message can include control path information for applying or implementing one or more RBAC policies, such as RBAC policy R1 indicated in the RBAC application request message of step 205. In some embodiments, the RBAC command message can represent a GUI interaction, an API interaction, or CLI interaction.

In some embodiments, an RBAC command message can be received by CIS 130 or CIS 140 and can be processed (e.g., verified) and can be routed to one or more components therein, such as a virtualization manager and/or a physical resource manager, for implementing RBAC.

It will be appreciated that the above described messages are for illustrative purposes and that different and/or additional messages can be used.

Figure 3:
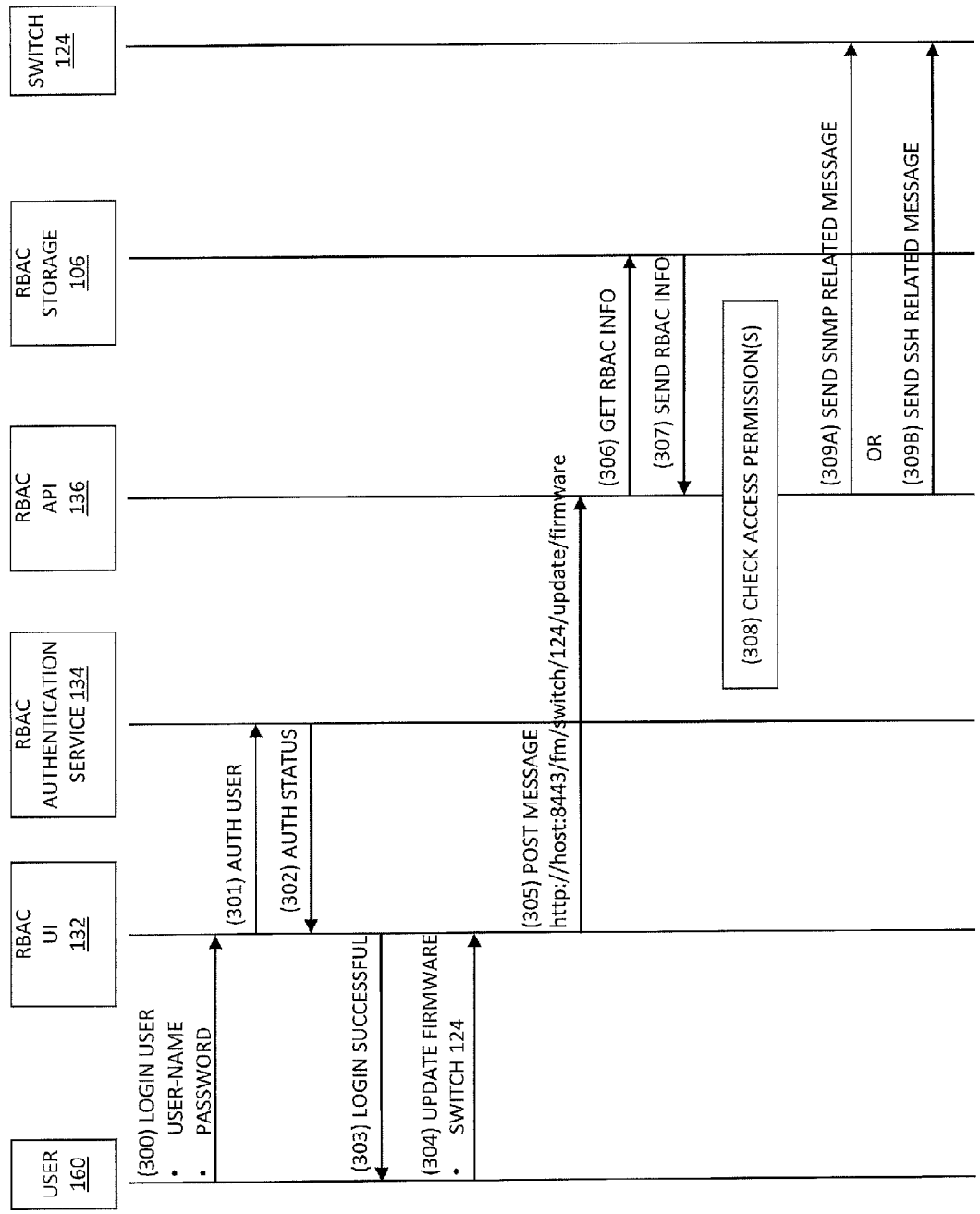
FIG. 3 is a diagram illustrating exemplary messages associated with implementing RBAC at a network switch according to an embodiment of the subject matter described herein.

FIG. 3 is a diagram illustrating exemplary messages associated with implementing RBAC at a network switch 124 according to an embodiment of the subject matter described herein. As illustrated in FIG. 3, stored RBAC related information (e.g., an RBAC policy associated with user 160) can be utilize when user 160 interacts with or attempts to interact with a component (e.g., switch 124) associated with CIS 100.

Referring to FIG. 3, at step 300, a login request message can be sent from user 160 to RBAC UI 132. The login request message can be for user authentication and can comprise user credentials, such as a username and password. In some embodiments, the login request message can represent a GUI interaction, an API interaction, or CLI interaction.

At step 301, an authentication request message containing user credentials can be sent from RBAC UI 132 to RAS 134. For example, RAS 134 can receive the authentication message and verify the included user credentials via CAS or another authentication mechanism.

At step 302, an authentication response message can be sent from RAS 134 to RBAC UI 132. The authentication response message can be for indicating that user authentication was completed successfully.

At step 303, a login response message can be sent from RBAC UI 132 to user 160. The login response message can be for indicating that user authentication was completed successfully. In some embodiments, the login response message can represent a GUI interaction, an API interaction, or CLI interaction.

At step 304, user 160 can provide input via RBAC UI 132 that indicates firmware at switch 124 is to be updated. For example, using a GUI, user 160 can select an icon representing switch 124 and select a button representing performing a firmware update at switch 124. In some embodiments, the user input can represent a GUI interaction, an API interaction, or CLI interaction.

In some embodiments, RBAC UI 132 can receive the user input and generate a REST API related message. For example, a REST API related message can include a HTTP POST message that indicates switch 124 is to update firmware.

At step 305, a REST API related message can be sent from RBAC UI 132 to RBAC API 136. In some embodiments, in response to receiving a message from RBAC UI 132, RBAC API 136 can be configured to query RBAC storage 106 for RBAC related information associated with user 160.

At step 306, an RBAC information request message can be sent from RBAC API 136 to RBAC storage 106. The RBAC information request message can be for requesting RBAC related information (e.g., permissions or access control information) associated with user 160.

At step 307, an RBAC information response message can be sent from RBAC storage 106 to RBAC API 136. The RBAC information response message can be for providing RBAC related information associated with user 160.

At step 308, RBAC API 136 can determine whether user 160 has sufficient permissions to perform firmware update as requested in the REST API related message of step 305. For example, using RBAC information received from RBAC storage 106, RBAC API 136 can check whether user 160 has sufficient permission for modifying switch 134.

In some embodiments, if user 160 has insufficient permissions, an error message or other message indicating that the requested action was not successful can be sent to RBAC UI 132 and/or user 160.

In some embodiments, if user 160 has sufficient permissions, RBAC API 136 can determine an appropriate communications protocol for interacting with switch 124. For example, RBAC API 136 can consult a component configuration database that maintains appropriate communications protocols used by various components associated with CIS 100. RBAC API 136 can generate one or more messages using any appropriate communications protocol such that switch 124 performs firmware update.

For example, at step 309A, an SNMP related message can be sent from RBAC API 136 to CIS 140. The SNMP related message can be for instructing or triggering switch 124 to perform a firmware update.

In another example, at step 309B, a secure shell (SSH) related message can be sent from RBAC API 136 to CIS 140. The SSH related message can be for instructing or triggering switch 124 to perform a firmware update.

It will be appreciated that the above described messages are for illustrative purposes and that different and/or additional messages can be used.

FIG. 4 is a diagram illustrating exemplary RBAC data 400 according to an embodiment of the subject matter described herein. Exemplary RBAC data 400 may represent RBAC related information. In some embodiments, RBAC data 400 can be accessible to RBAC module 104 and/or other entities, e.g., CIS 100, CIS 130, CIS 140, and/or CIS 150. In some embodiments, RBAC data 400 can be stored in RBAC storage 106 using one or more data structures.

In some embodiments, RBAC data 400 can be obtained, deleted, modified, and/or provided via one or more communications interfaces. For example, RBAC module 104 can provide or utilize RBAC UI 132 (e.g., a GUI, a CLI, or an AP)I for receiving or sending RBAC data or related RBAC configuration information.

Referring to FIG. 4, RBAC data 400 can comprise associations between user identifiers (e.g., usernames), one or more roles, related permissions, and one or more locations. For example, a table representing RBAC data 400 can comprise a username field, a role(s) field, a permission(s) field, and a location(s) field. A username field can comprise user identifiers (or portions thereof), such as unique numbers or text for indicating a particular user, e.g., 'ASMITH23', 'GWU73', 'KNGUYEN34', 'RKING86', 'LQO180', or TMARQUEZ12'. A role(s) field can comprise role identifiers, such as unique numbers or text for indicating a particular role, e.g., 'ADMINISTRATOR', 'AUDITOR', 'TESTER', 'SITE MANAGER', 'SITE TECHNICIAN', and/or 'DATA CENTER MANAGER'. A permission(s) field can comprise permission identifiers, such as unique numbers or text for indicating a particular permission or set of permissions, e.g., 'SET A', 'SET B', 'SET C', 'SET D', 'SET A', 'SET E', and/or 'SET F'. A location(s) field can comprise location identifiers, such as unique numbers or text for indicating a particular location where an RBAC policy is to be implemented, e.g., VBLOCK-1', VBLOCK-2', 'VM-1.VBLOCK-2', VBLOCK-3', VBLOCK-4'.

In some embodiments, users can be associated with multiple roles and/or multiple locations. For example, as depicted in FIG. 4, user 'ASMITH23' can be associated with different roles (and permissions) for each CIS or portions therein. In this example, user "ASMITH23" can be associated with a "SITE MANAGER' role for some Vblock™ Systems and can be associated with an "AUDITOR" role for other Vblock™ Systems. Hence, user "ASMITH23 may have read and write permissions at one CIS, but only read permissions at another CIS.

It will be appreciated that RBAC data 400 is illustrative and that additional and/or different information can be used in configuring or implementing RBAC. For example, while RBAC data 400 can comprise permission set identifiers, additional data can be needed to identify each permission associated with a permission set identifier. In this example, a second data set can comprise individual permissions associated with each permission set identifier.

Figure 5:
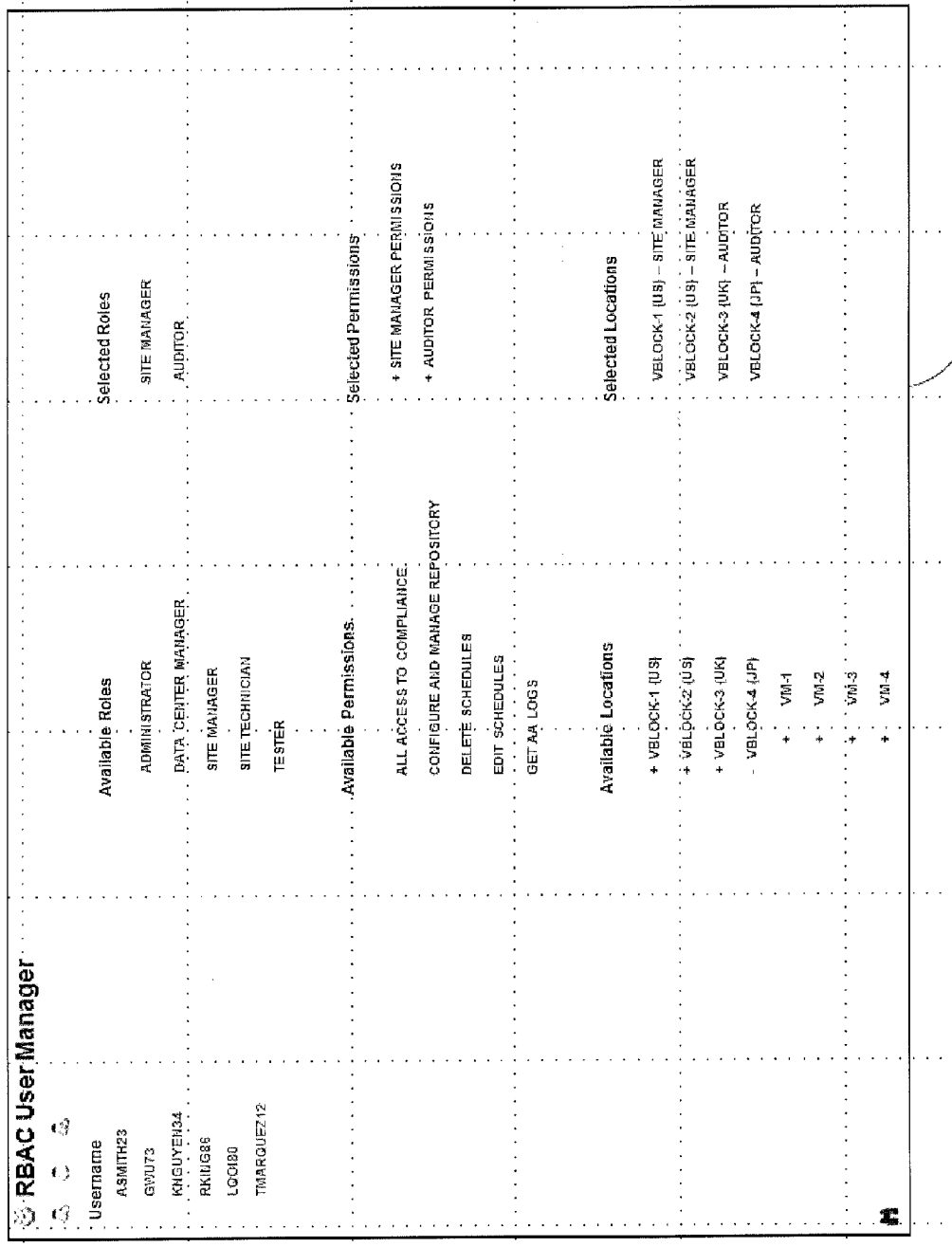
FIG. 5 is a screenshot illustrating an exemplary RBAC user interface according to an embodiment of the subject matter described herein.

FIG. 5 is a screenshot 500 illustrating RBAC UI 132 according to an embodiment of the subject matter described herein. In some embodiments, RBAC module 104 and/or associated module or node can comprise or provide a GUI for configuring RBAC policies and/or for implementing RBAC policies.

In some embodiments, an RBAC policy can comprise one or more permissions associated with one or more roles. For example, a role can represent a named list of permissions. In this example, a role can represent an entity capable of performing a given set of operations defined by permissions. One or more roles can be assigned to users and these assignments can dictate what users can or cannot do within a given application, resource, or system. By associating users to roles, users may be able to access resources that are attributed to associated roles.

In the embodiment illustrated in FIG. 5, screenshot 500 can depict RBAC UI 132 associated with configuring and/or implementing RBAC. RBAC UI 132 can provide user interface elements for selecting RBAC policy components, such as a user identifier (e.g., a username), one or more roles associated with the user identifier, one or more permissions associated with a role or roles, and locations (e.g., systems or portions of systems) where the RBAC policy is to be implemented.

In some embodiments, RBAC UI 132 can provide a drop down menu for selecting a username from a plurality of usernames. In this example, the plurality of usernames can comprise all authorized users or a subset thereof.

In some embodiments, a user identifier or username can be added, deleted, or modified using RBAC UI or a related mechanism. For example, a new user can be created that is associated with a unique username and can be assigned various roles and related permissions.

In some embodiments, a username can be selectable (or non-selectable) or visible (or invisible) depending of permissions associated with the user attempting to perform RBAC configuration. For example, an information technology (IT) technician may be able to configure permissions for non-IT or non-executive employees, but an IT manager may be able to configure permissions for all employees.

In some embodiments, RBAC UI 132 can provide a UI element for selecting one or more roles from a plurality of roles. For example, a list box can display a plurality of selectable or available roles. In this example, a UI user can double click or otherwise indicate that one or more roles in the list box are to be associated with a username. After selecting the one or more roles, the selected roles can appear in a second list box for indicating that the roles are selected.

In some embodiments, a role can be added or modified using RBAC UI or a related mechanism. For example, a new role can be created that is associated with a unique set of permissions.

In some embodiments, a role can be selectable (or non-selectable) or visible (or invisible) depending of permissions associated with the user attempting to perform RBAC configuration. For example, an information technology (IT) technician may be able to assign users to non-IT roles, but an IT manager may be able to assign users to different roles.

In some embodiments, RBAC UI 132 can provide a UI element for selecting one or more permissions from a plurality of permissions. For example, a list box can display a plurality of selectable or available permissions. In this example, a UI user can double click or otherwise indicate that one or more permissions in the list box are to be associated with a role or roles. After selecting the one or more permissions, the selected permissions can appear in a second list box for indicating that the permissions are selected.

In some embodiments, a permission can be added, deleted, or modified using RBAC UI or a related mechanism. For example, a new permission can be created that is associated with a new resource, component, or service. In some embodiments, a permission can be displayed as part of a permission set or a role-based permission set. For example, RBAC UI 132 can provide a tree list box for displaying a plurality of permission sets. In this example, a UI user can click a '+' symbol beside a permissions set to view sub-sets (e.g., a set 'A' or a set 'B' of permissions) or individual permissions. The UI user can double click or otherwise indicate that one or more permissions or permission sets in the tree list box are to be associated with an RBAC policy. After selecting the one or more permissions or permission sets, a UI element can be used for indicating which of the selected permissions or permission sets are to be associated with a given role and the permissions or permission sets can appear in a second list box for indicating that the permissions or permission sets are selected.

In some embodiments, a permission can be selectable (or non-selectable) or visible (or invisible) depending of permissions associated with the user attempting to perform RBAC configuration. For example, an information technology (IT) technician may be able to assign certain permissions, but an IT manager may be able to assign different permissions.

In some embodiments, RBAC UI 132 can provide a UI element for selecting one or more locations (e.g., CIS 100 or portions therein) from a plurality of locations. In some embodiments, each location can represent a system, a network, a virtual machine, a virtual resource, a physical resource, one or more CISs, or a component of a CIS. For example, RBAC UI 132 can provide a tree list box for displaying a plurality of selectable or available locations. In this example, a UI user can click a '+' symbol beside a location to view sub-locations (e.g., VM 110, VM 112, and/or VM 114). The UI user can double click or otherwise indicate that one or more locations (or sub-locations) in the tree list box are to be associated with an RBAC policy. After selecting the one or more locations, the selected locations can appear in a second list box for indicating that the locations are selected.

In some embodiments, RBAC UI 132 can provide one or more UI elements for indicating whether a role is to be applied to one or more locations. In such embodiments, RBAC UI 132 can be configured to notify the user or request confirmation from the user regarding RBAC applicability, such as when two or more roles are selected and/or more than one location is selected. For example, if two roles are selected for a user and a new location is selected, a UI element (e.g., a message dialog box for requesting and receiving user input) can be used for selecting which roles are to be applied for the new location. In another example, if multiple locations are selected and a new role is selected, a UI element can be used for selecting which of the one or more selected locations is the new role applicable.

In some embodiments, a location can be selectable (or non-selectable) or visible (or invisible) depending of permissions associated with the user attempting to perform RBAC configuration. For example, an information technology (IT) technician may be able to configure RBAC for users at certain locations, but an IT manager may be able to configure RBAC for users at different locations.

In some embodiments, a location can be added, deleted, or modified using RBAC UI or a related mechanism. For example, a new location can be created if a new CIS (e.g., a Vblock™ System) is added to a deployment environment or a new VM is instantiated at CIS 100.

In some embodiments, RBAC UI 132 can provide a UI element for storing or saving RBAC related information. For example, RBAC UI 132 can provide a 'SAVE' button for storing an RBAC policy associated with a user identifier.

In some embodiments, RBAC UI 132 can provide a UI element for implementing RBAC related information (e.g., an RBAC policy). For example, RBAC UI 132 can provide an 'APPLY' button for applying, at all selected locations, RBAC policies associated with a user identifier.

It will be appreciated that providing RBAC UI 132 for configuring various RBAC functions and/or policies, including location and role granularity for CIS users, and allowing such RBAC functions and/or policies to be applied on any participating CIS (e.g., CIS 140 or CIS 150) from a centralized location (e.g., CIS 130 where an RBAC administrator is currently logged in) can provide significant efficiency gains and/or other improvements over conventional RBAC implementations.

Figure 6:
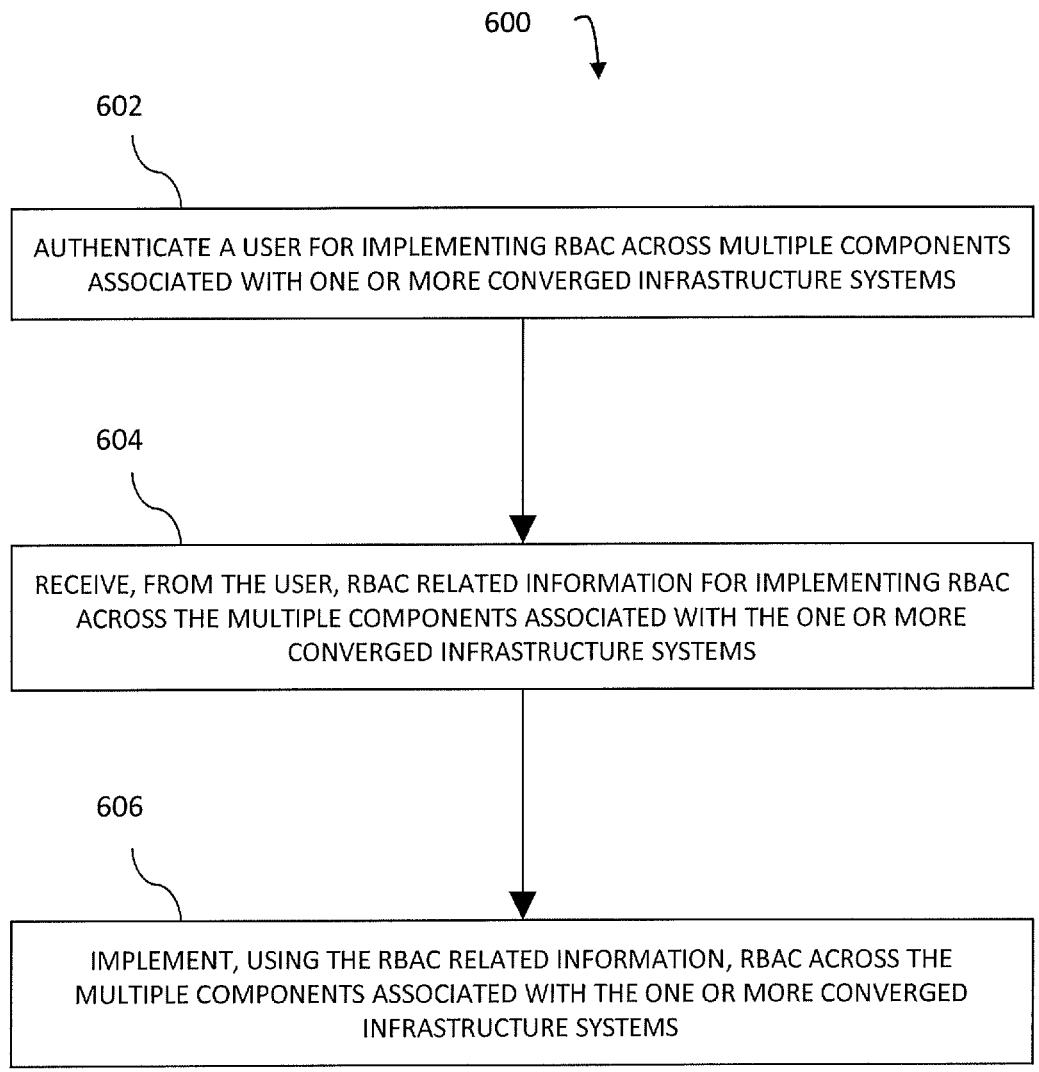
FIG. 6 is a diagram illustrating an exemplary process for implementing RBAC according to an embodiment of the subject matter described herein.

FIG. 6 is a diagram illustrating an exemplary process 600 for implementing RBAC according to an embodiment of the subject matter described herein. In some embodiments, exemplary process 600, or portions thereof, can be performed by or at RBAC module 104, CIS manager 102, virtualization manager 116, physical resource manager 120, and/or another node or module. In some embodiments, exemplary process 600 can comprise steps 602, 604, and/or 606.

Referring to exemplary process 600, at step 602, a user is authenticated for implementing RBAC across multiple components associated with one or more CISs (e.g., CIS 100, CIS 130, CIS 140, and/or CIS 150). For example, user 160 can provide a username and a password or other credentials during a login procedure at CIS 100. In the example, RBAC 104 or RAS 134 can analyze the login information (e.g., using use CAS or another authentication service) to determine whether the user is authorized for implementing RBAC.

In some embodiments, authenticating a user for implementing RBAC across multiple components associated with one or more CISs comprises authenticating the user at a first converged infrastructure system and wherein implementing RBAC comprises sending control path information to the first converged infrastructure system or a second converged infrastructure system, e.g., associated with a same operator, business, network, or deployment environment.

At step 604, configuration information is received from the user. The configuration information can be for implementing RBAC across the multiple components associated with the one or more CISs. In some embodiments, configuration information is received via an API, a CLI, or a GUI. For example, a GUI can be provided to user 160 logged in at CIS 100. In this example, user 160 can implement RBAC for CIS 100, CIS 130, CIS 140, CIS 150, and/or portions therein.

At step 606, RBAC is implemented, using the RBAC related information, across the multiple components associated with the one or more CISs.

In some embodiments, one or more CISs comprise one or more virtualization capable computing platforms, such as Vblock™ Systems.

In some embodiments, implementing RBAC includes implementing RBAC at a logical entity comprising at least two of a computing component, a software component, a networking component, a physical resource, a virtual resource, a hardware component, and/or a firmware component.

In some embodiments, implementing RBAC across multiple components associated with one or more CISs comprises generating an RBAC policy based on the RBAC related information to utilize multiple components of a first converged infrastructure system and/or a second converged infrastructure system.

In some embodiments, an RBAC policy comprises one or more permissions to utilize a service, a resource, or a component associated with performing a particular role.

In some embodiments, RBAC related information (e.g., an RBAC policy or RBAC configuration information) is stored in a clustered database system accessible by the one or more CISs. For example, after an RBAC policy is generated by user 160, the policy can be stored in a database or memory and can be used at a later time.

In some embodiments, implementing RBAC across the multiple components comprises generating, using a representational state transfer (REST) application programming interface (API) related message, one or more appropriate messages for triggering RBAC at the one or more components.

In some embodiments, messages for triggering RBAC at a CIS component includes an SNMP related message, a telnet related message, a SSH protocol related message, a command line related message, an extensible markup language (XML) API related message, an XML related message, and/or a storage management interface (SMI) related message.

Figure 7:
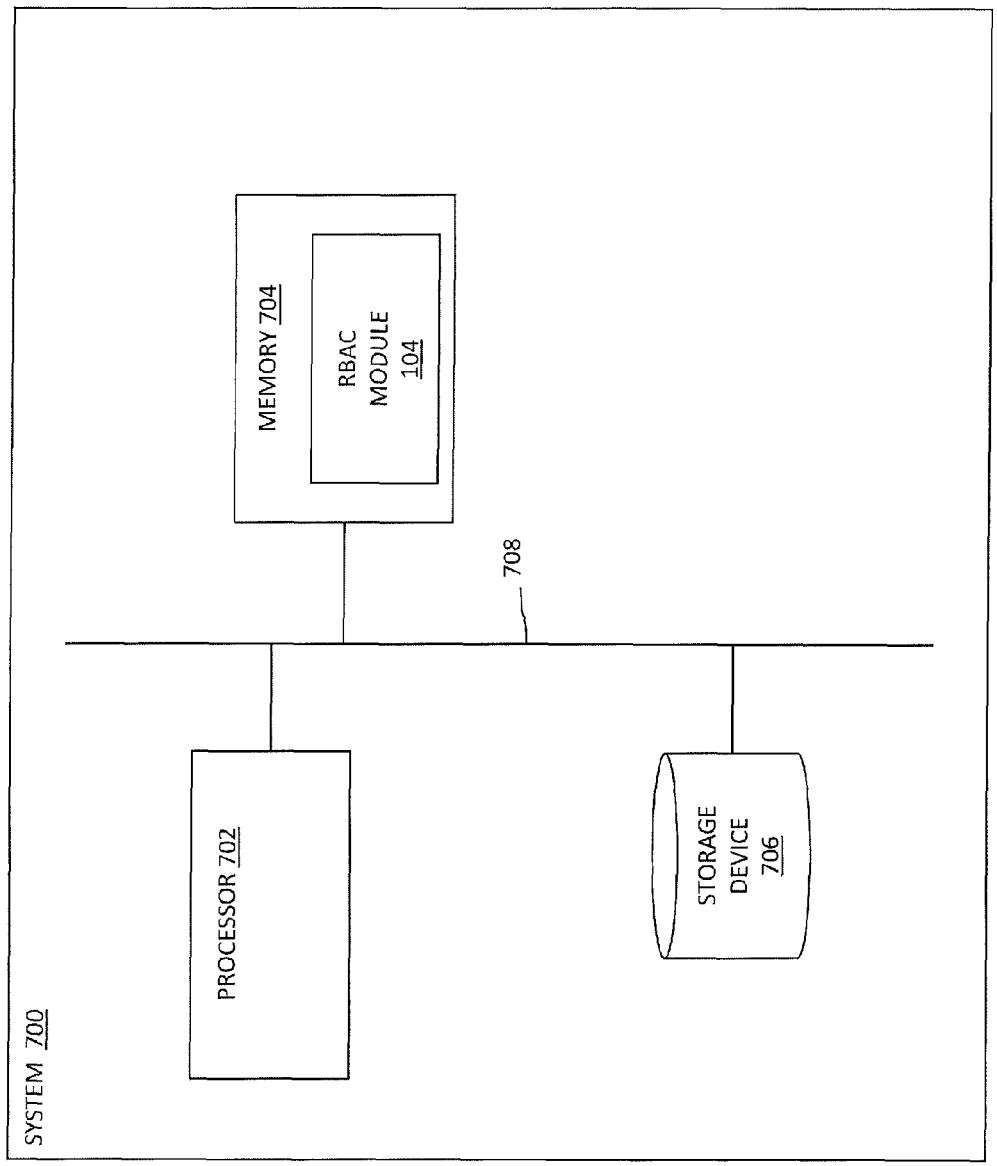
FIG. 7 depicts a high level block diagram of a general purpose computer system suitable for use in performing the functions described herein.

FIG. 7 depicts a high level block diagram of a general purpose computer system 700 suitable for use in performing the functions described herein. As depicted in FIG. 7, system 700 includes a processor 702, a memory 704, a storage device 706 communicatively connected via a system bus 708. In some embodiments, processor 702 can include a microprocessor, central processing unit (CPU), or any other like hardware based processing unit. In some embodiments, an RBAC module 104 can be stored in memory 704, which can include random access memory (RAM), read only memory (ROM), optical read/write memory, cache memory, magnetic read/write memory, flash memory, or any other non-transitory computer readable medium. In some embodiments, processor 702 and memory 704 can be used to execute and manage the operation of RBAC module 104. In some embodiments, storage device 706 can include any storage medium or storage unit that is configured to store data accessible by processor 702 via system bus 708. Exemplary storage devices can include one or more local databases hosted by system 700.

As indicated above, the subject matter described herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

It will be understood that various details of the subject matter described herein can be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for implementing role-based access control (RBAC), the method comprising:
   authenticating, by a first computer system, a user for implementing RBAC across multiple components associated with one or more computer systems;
   receiving, from the user, RBAC related information for implementing RBAC across the multiple components associated with the one or more computer systems, wherein the RBAC related information includes an RBAC policy providing one or more role based permissions, where each of the one or more role based permissions is associated with a different heterogeneous component of the multiple components; and
   implementing, using the RBAC related information, RBAC across the multiple components associated with the one or more computer systems, wherein implementing RBAC comprises sending control path information from the first computer system to a second computer system, wherein implementing RBAC across the multiple components includes implementing RBAC at a logical entity comprising at least two members selected from a group consisting of a computing component, a software component, a networking component, a physical resource, a virtual resource, a hardware component, and a firmware component, wherein implementing RBAC across the multiple components comprises generating one or more appropriate messages for triggering RBAC at the multiple components using a representational state transfer (REST) application programming interface (API) related message, wherein the control path information instructs the second computer system to implement the RBAC policy.

2. The method of claim 1 comprising:
   storing the RBAC related information in a clustered database system accessible by the one or more computer systems.

3. The method of claim 1 wherein receiving the RBAC related information comprises receiving the RBAC related information via an application programming interface, a command line interface, or a graphical user interface associated with one of the one or more computer systems.

4. The method of claim 1 wherein the one or more appropriate messages include a simple network management (SNMP) related message, a telnet related message, a secure shell related message, a command line related message, an extensible markup language (XML) API related message, an XML related message, and/or a storage management interface (SMI) related message.

5. A system for implementing role-based access control (RBAC), the system comprising:
   at least one processor;
   memory; and
   an RBAC module utilizing the at least one processor and the memory, wherein the RBAC module is configured to authenticate, by a first computer system, a user for implementing RBAC across multiple components associated with one or more computer systems, wherein the RBAC related information includes an RBAC policy providing one or more role based permissions, where each of the one or more role based permissions is associated with a different heterogeneous component of the multiple components, to receive, from the user, RBAC related information for implementing RBAC across the multiple components associated with the one or more computer systems, and to implement, using the RBAC related information, RBAC across the multiple components associated with the one or more computer systems, wherein implementing RBAC comprises sending control path information from the first computer system to a second computer system, wherein the RBAC module is further configured to implement RBAC at a logical entity comprising at least two members selected from a group consisting of a computing component, a software component, a networking component, a physical resource, a virtual resource, a hardware component, and a firmware component, and wherein the RBAC module is configured to implement RBAC across the multiple components by generating one or more appropriate messages for triggering RBAC at the multiple components using a representational state transfer (REST) application programming interface (API) related message, wherein the control path information instructs the second computer system to implement the RBAC policy.

6. The system of claim 5 wherein the RBAC module is configured to store the RBAC related information in a clustered database system accessible by the one or more computer systems.

7. The system of claim 5 wherein the RBAC module is configured to receive the RBAC related information via an application programming interface, a command line interface, or a graphical user interface associated with one of the one or more computer systems.

8. The system of claim 5 wherein the one or more appropriate messages include a simple network management (SNMP) related message, a telnet related message, a secure shell related message, a command line related message, an extensible markup language (XML) API related message, an XML related message, and/or a storage management interface (SMI) related message.

9. A non-transitory computer readable medium having stored thereon executable instructions that when executed by a processor of a computer control the computer to perform steps comprising:

authenticating, by a first computer system, a user for implementing RBAC across multiple components associated with one or more computer systems;

receiving, from the user, RBAC related information for implementing RBAC across the multiple components associated with the one or more computer systems, wherein the RBAC related information includes an RBAC policy providing one or more role based permissions, where each of the one or more role based permissions is associated with a different heterogeneous component of the multiple components; and implementing, using the RBAC related information, RBAC across the multiple components associated with the one or more computer systems, wherein implementing RBAC comprises sending control path information from the first computer system to a second computer system, wherein implementing RBAC across the multiple components includes implementing RBAC at a logical entity comprising at least two members selected from a group consisting of a computing component, a software component, a networking component, a physical resource, a virtual resource, a hardware component, and a firmware component, wherein implementing RBAC across the multiple components comprises generating one or more appropriate messages for triggering RBAC at the multiple components using a representational state transfer (REST) application programming interface (API) related message, wherein the control path information instructs the second computer system to implement the RBAC policy.

10. The non-transitory computer readable medium of claim 9 comprising:

storing the RBAC related information in a clustered database system accessible by the one or more computer systems.

11. The non-transitory computer readable medium of claim 9 wherein the one or more appropriate messages include a simple network management (SNMP) related message, a telnet related message, a secure shell related message, a command line related message, an extensible markup language (XML) API related message, an XML related message, and/or a storage management interface (SMI) related message.

* * * * *